Dec. 31, 1929.  W. L. WALL  1,741,213
EYE TESTING APPARATUS
Filed May 16, 1927
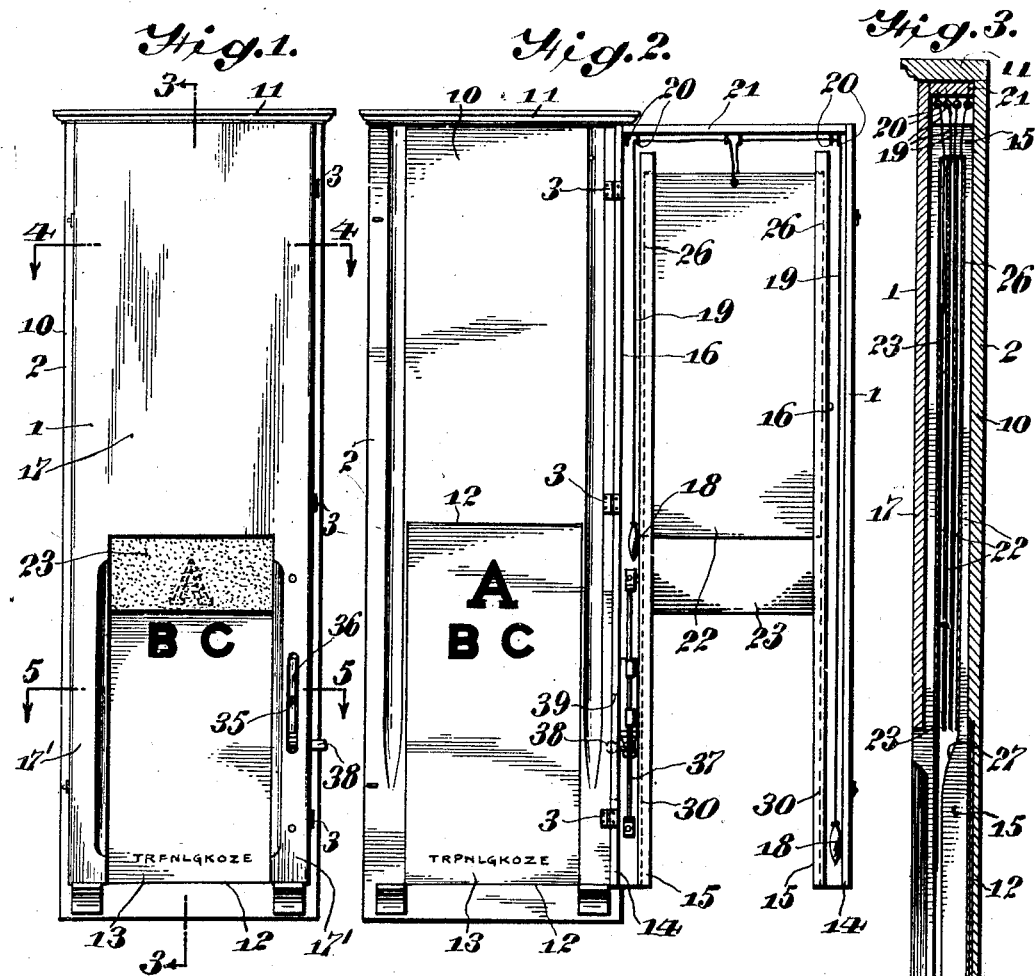
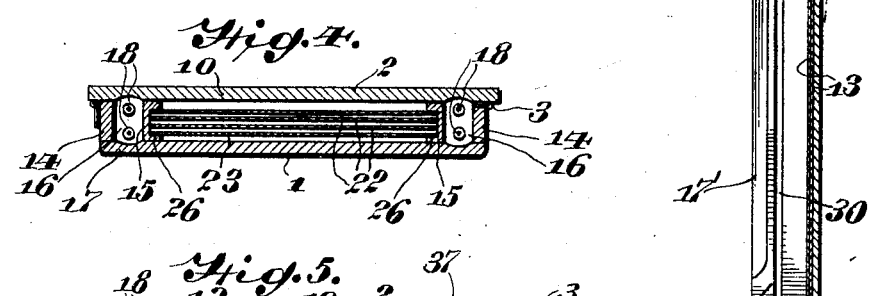
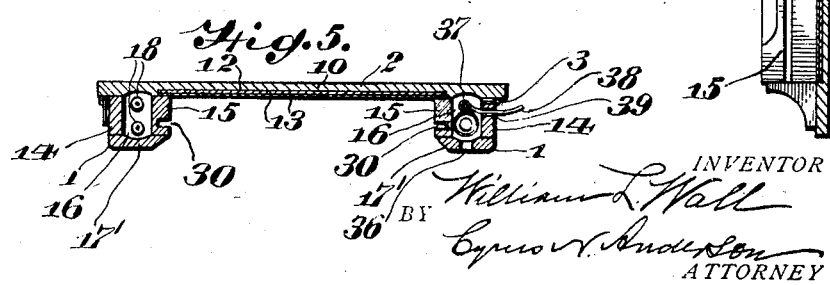
INVENTOR
William L. Wall
BY Cyrus N. Anderson
ATTORNEY Patented Dec. 31, 1929

1,741,213

UNITED STATES PATENT OFFICE

WILLIAM L. WALL, OF PHILADELPHIA, PENNSYLVANIA, ASSIGNOR TO WALL & OCHS, INCORPORATED, OF PHILADELPHIA, PENNSYLVANIA, A CORPORATION OF PENNSYLVANIA

EYE-TESTING APPARATUS

Application filed May 16, 1927. Serial No. 191,629.

My invention relates to apparatus which is adapted to be employed for ascertaining the amount of refraction necessary for the correction of imperfect vision and also for the purpose of testing the eye muscles to ascertain the condition thereof.

A general object of the invention is to provide an apparatus of the character indicated having a novel construction of means for adjustably supporting a plurality of test cards and also for adjustably supporting means for testing the eye control muscles for the purpose of ascertaining their condition.

It also is an object of the invention to provide a support for eye test cards having means of novel construction whereby the positioning of the said cards in the examination of eyes may be facilitated and whereby also, when thus positioned, they are held against movement.

A further object of the invention is to provide an apparatus having means embodied therein for supporting a plurality of test cards and also having means whereby the eye control muscles may be tested for the purpose of ascertaining their condition.

Another object of the invention is to provide an apparatus having means whereby any one of a plurality of test cards may be readily adjusted into position to facilitate the examination of eyes and also having means embodied therein and located in operative relation to the test cards to enable the eye muscles to be tested for the purpose of ascertaining the condition thereof.

To these and other ends the invention comprehends the construction and arrangement of parts as hereinafter pointed out in detail, particularly set forth and defined in the claims and as illustrated in the drawing in which I have illustrated one form of a convenient embodiment of the said invention.

In the drawing:

Fig. 1 is a view in front elevation of an apparatus embodying the invention;

Fig. 2 is a view in elevation showing the front portion of the device in opened relation to the other portion thereof, the rear side of the opened portion being shown;

Fig. 3 is a view in longitudinal section taken on the line 3—3 of Fig. 1;

Fig. 4 is a transverse sectional view taken on the line 4—4 of Fig. 1; and

Fig. 5 is a similar view taken on the line 5—5 of Fig. 1.

In the drawing I have shown a cabinet comprising front and rear portions 1 and 2 connected together along one edge by means of the hinges 3, whereby the front portion may be opened, as shown in Fig. 2. In actual use the base portion 2 would be held or supported in stationary position and the front portion 1 would be moved or movable into open position, as shown in Fig. 2.

The base portion 2 comprises a back 10 which extends from top to bottom of the apparatus, which back is provided at its upper end with a forwardly extending over-hanging top member 11.

The lower portion of the back 10 is provided upon its front side with a depression or seat as indicated at 12, within which is mounted one or more test cards 13, having thereon test objects, such as letters, at which a person's eyes which are being examined are directed in the course of the examination by an oculist or optician. These cards 13 are not adjustable and there may be one or more of them, two being shown in the construction as illustrated.

The hinged cover or top portion 1 of the apparatus is provided adjoining each of its edges with two parallel spaced strips 14 and 15, which are of a length very nearly equal to that of the apparatus. These strips are spaced from each other to provide channels or elongated chambers 16, the upper portions thereof being closed by the opposite edge portions of the cover plate or board 17, while the lower portions thereof are covered or closed by extensions 17' of the opposite edge portions of the said cover plate or board. The central portion of the cover plate or board terminates at a point about the middle of the length of the structure. These channels or chambers are provided for the accommodation of small weights 18 suspended upon cords 19 which are threaded through eyes 20 secured to the underside of the top member 21 secured at its opposite ends to the upper ends of the outer strips 14.

The upper ends of the inner strips 15 terminate short distances below the top member 21. The upper inner ends of the cords 19 are secured to test cards 22, and a black cover card 23. In the construction as illustrated, there are three test cards 22 shown, but the number may be increased or diminished within reasonable limits. The front card 23 is for the purpose of covering up or concealing from view the test letters upon the front faces of the test cards. It will be apparent that any desired number or all of the said test letters may be covered up and concealed from view. The cover card 23 is also available for use in connection with the test cards 13 to which reference has been made previously.

The cards 22 and 23, when in their uppermost positions, are located underneath the front plate or board 17 of the cover portion 1 of the structure. The opposite edges of the said cards are located in enlarged channels 26 in the inner edges of the inner strips 15. The rear edge of each of these channels, at its lower end, is tapered or inclined forwardly as indicated at 27, in Fig. 3 of the drawing, so that the channels 26 merge into and are continued by the narrow channels 30 in the lower portions of the inner sides of the strips 15. The channel 30 should be relatively narrow, but of a width sufficient to accommodate the thickness of two cards, to wit, the front cover card 23 and any one of the test cards 22 upon the front surface of which appear the test objects consisting of letters as previously stated.

The lower ends of the cards 22 and 23 may be provided, for convenience of adjustment, with tabs, not shown. In Fig. 3 of the drawing the front cover card 23 is shown in partially lowered position so that it covers the upper portion of the front one of the cards 13, as a result of which the test objects upon the upper portion of the said card 13 are concealed from view.

By the construction as shown and as described above, I have provided means whereby a plurality of cards may be housed and whereby any one of the said cards may be drawn down into desired position when the apparatus is being employed in the examination of eyes. I have also provided means whereby when the cards have been drawn down into such position they are held steady against movements which might be caused by air currents in the room where the examination is being made.

In the examination of eyes it is usual to test the control muscles thereof and for that purpose a light is employed. It is desirable that such light be associated with the means, namely the test objects upon the test cards, for examining for refraction defects of the eyes. In the examination or testing of the eye control muscles, it is necessary, in order that the best results be obtained, that the light shall occupy the same horizontal plane as that in which the eyes are located. In other words, it is desirable that the test light and the eyes shall occupy the same level. To that end I have provided an electric light indicated at 35 which is visible through a slot 36 in one of the extension strips 17'. The said light is adjustably supported upon a rod 37 mounted in the lower portion of one of the channels 16. In the construction as shown the said light is located in the channel at the right hand side of the structure, having reference to Fig. 1 of the drawing. The light is adjustable upon the rod 37, such adjustment being desirable in order that it may be brought into a horizontal plane coincidental with that in which the eyes are located. For the purpose of adjusting the light, a finger piece or handle 38 projects outwardly through a slot 39.

It will be seen that by my invention I have provided means whereby the test cards when not in use may be conveniently housed and whereby when they are moved into operative position for the examination of eyes, they are held practically against movement; also that I have provided means in convenient and practicable relation to the test cards, whereby the eye control muscles may be examined in an efficient and convenient manner.

Having thus described my invention, what I claim and desire to secure by Letters Patent is:

1. Eye testing apparatus comprising a housing the opposite sides of which are provided with channels located upon the inner surfaces thereof of a width to accommodate a plurality of test cards, the lower ends of which channels merge into relatively narrow channels and a plurality of test cards mounted within the relatively wide channels, any one of which is adapted to be moved into the relatively narrow channels.

2. Eye testing apparatus comprising a housing for a plurality of test cards and a cover card the opposite sides of said housing having upon the inner surfaces of their upper portions relatively wide channels which face each other, the lower ends of the rear edges of which are inclined toward the front and merge into relatively narrow channels, a plurality of test cards and a cover card mounted within the said housing and having their opposite edges located in the relatively wide channels first mentioned, any one of which test cards and the said cover card being adapted to be moved into position in the said narrow channels, and means for retaining the said cards in any position to which they may be adjusted.

3. Eye testing apparatus comprising front and rear portions hinged together along one edge, the front portion co-operating with the rear portion to form a housing, the inner surfaces of the upper portions of the opposite sides of the front portion of the said apparatus being provided with relatively wide channels the said channels merging into relatively narrow channels in the inner surfaces of the lower portions of the said sides, a plurality of cards adapted to be housed in the relatively wide channels, any one of which cards may be moved into position in the relatively narrow channels, and means for retaining the said cards in any position to which they may be adjusted.

4. Eye testing apparatus comprising front and rear portions, the upper part of the front portion co-operating with the rear portion to form a housing for a plurality of cards, a portion of the lower part of the front portion of the apparatus being cut away to expose the front surface of the rear portion of the apparatus, test cards mounted upon the latter portion and the inner surfaces of the opposite sides of the upper part of the front portion of the apparatus being provided with relatively wide channels the rear edges of which are inclined toward the front and merge into relatively narrow channels which extend downwardly from the lower ends of the said relatively wide channels the said inclined portions constituting guides for directing cards into the said narrow channels, a plurality of cards adapted to be supported in said housing with their opposite edges located in the relatively wide channels any one of which cards may be adjusted downwardly into the said narrow channels, and means for supporting any one of said cards in any position to which it may be adjusted.

5. Eye testing apparatus comprising means for housing a plurality of test cards, means for holding said cards against movement after they have been adjusted into position for the examination of eyes to ascertain the refractive condition of the eyes, and a light source adjustably mounted for vertical movement upon said apparatus and visible from a point in front of said apparatus for testing the eye control muscles, the said light source being supported in co-operative relation to test cards which may be employed for testing the eyes.

6. Eye testing apparatus comprising front and rear portions hingedly connected together along one edge, the upper parts of said portions co-operating to form a housing for a plurality of cards which cards are supported upon the front portion of the said apparatus, and the said cards being adapted to be adjusted singly into position to be used for the testing of eyes, and a light adjustably mounted for vertical movement upon the said front portion and visible from a point in front of said apparatus for testing the eye control muscles, the said light being located in contiguous relation to the position occupied by test cards when moved into positions for testing the eyes, substantially described.

7. Eye testing apparatus comprising a housing the opposite sides of which are provided with channels located upon the inner surfaces thereof of a width to accommodate a plurality of test cards the lower ends of which channels merge into relatively narrow channels, a plurality of test cards mounted within the relatively wide portions of said channels any one of which is adapted to be moved into the relatively narrow channels, and means for covering the test card which is moved into the said narrow channels.

8. Eye testing apparatus comprising a housing the opposite sides of which are provided with channels located upon the inner surfaces thereof of a width to accommodate a plurality of test cards and a cover card therefor the lower ends of which channels merge into relatively narrow channels, and a plurality of test cards and a cover card therefor mounted within the relatively wide channels, the said cover card and any one of said test cards being adapted to be moved into the relatively narrow channels and to be adjusted therein.

9. Eye testing apparatus comprising a housing the opposite sides of which are provided with channels located upon the inner surfaces thereof, the upper portions of said channels being of a width to accommodate a plurality of test cards and the lower portions of which are relatively narrow, test cards mounted within the relatively wide portions of said channels any one of which is adapted to be moved into the narrow portions of the said channels, and means adapted to be moved into the said narrow channels to cover the test card which is positioned therein, the said means and the said test card being adjustable.

In testimony that I claim the foregoing as my invention, I have hereunto signed my name this 14th day of May, A. D., 1927.

WILLIAM L. WALL.